United States Patent
Boisson et al.

(10) Patent No.: US 10,778,062 B2
(45) Date of Patent: Sep. 15, 2020

(54) ELECTRIC MACHINE AND METHOD FOR DYNAMICALLY BALANCING THE ROTOR OF SAID ELECTRIC MACHINE

(71) Applicants: IFP Energies nouvelles, Rueil-Malmaison (FR); MAVEL S.r.l., Pont Saint Martin AO (IT)

(72) Inventors: Julien Boisson, Sceaux (FR); Wissam Dib, Suresnes (FR); Rinato Biglino, Genoa (IT); Davide Bettoni, Settimo Vittone (IT)

(73) Assignees: IFP ENERGIES NOUVELLES, Rueil-Malmaison (FR); MAVEL S.R.L., Point Saint Martin (IT)

( * ) Notice: Subject to any disclaimer, the term of this patent is extended or adjusted under 35 U.S.C. 154(b) by 0 days.

(21) Appl. No.: 15/568,706

(22) PCT Filed: Apr. 12, 2016

(86) PCT No.: PCT/EP2016/057989
§ 371 (c)(1),
(2) Date: Oct. 23, 2017

(87) PCT Pub. No.: WO2016/169808
PCT Pub. Date: Oct. 27, 2016

(65) Prior Publication Data
US 2018/0166947 A1    Jun. 14, 2018

(30) Foreign Application Priority Data
Apr. 23, 2015   (FR) .................................. 15 53631

(51) Int. Cl.
H02K 7/04      (2006.01)
H02K 15/16    (2006.01)
H02K 1/27      (2006.01)

(52) U.S. Cl.
CPC ............. *H02K 7/04* (2013.01); *H02K 1/2766* (2013.01); *H02K 15/165* (2013.01)

(58) Field of Classification Search
CPC ........ H02K 7/04; H02K 15/165; F16F 15/363
See application file for complete search history.

(56) References Cited

U.S. PATENT DOCUMENTS 4,486,678 A      12/1984   Olson
5,894,183 A *    4/1999    Borchert ................ H02K 15/03
                                                                      310/152

(Continued)

FOREIGN PATENT DOCUMENTS

DE     102010041599 A1    3/2012
FR     1341204 A              10/1963
FR     2421498 A              10/1979

OTHER PUBLICATIONS

International Search Report for PCT/EP2016/057989 dated Jun. 8, 2016; English translation submitted herewith (8 pages).

*Primary Examiner* — Dang D Le
(74) *Attorney, Agent, or Firm* — Fitch, Even, Tabin & Flannery LLP

(57) ABSTRACT

The present invention is an electrical machine comprising a stator and a rotor (10), with rotor being formed with a rotor body (20) from a stack of laminations (14) placed on a rotor shaft (12). According to the invention, the rotor comprises at least one cavity (38) for receiving at least one balance weight (48) for the dynamic balancing of the said rotor.

10 Claims, 1 Drawing Sheet

(56) References Cited

U.S. PATENT DOCUMENTS

| | | | |
|---|---|---|---|
| 6,570,291 B1 * | 5/2003 | Spaggiari | F16F 15/32 310/214 |
| 2009/0066174 A1 | 3/2009 | Watson | |
| 2011/0121668 A1 | 5/2011 | Condamin et al. | |
| 2013/0257189 A1 | 10/2013 | Blum et al. | |

* cited by examiner

ELECTRIC MACHINE AND METHOD FOR DYNAMICALLY BALANCING THE ROTOR OF SAID ELECTRIC MACHINE

CROSS-REFERENCE TO RELATED APPLICATIONS

This application is a U.S. national phase application filed under 35 U.S.C. § 371 of International Application No. PCT/EP2016/057989, filed Apr. 12, 2016, designating the United States, which claims priority from French Patent Application No. 15/53.631, filed Apr. 23, 2015, which are hereby incorporated herein by reference in their entirety.

BACKGROUND OF THE INVENTION

Field of the Invention

The present invention relates to an electric machine and to a method for the dynamic balancing of the rotor of electric machine and more particularly to a variable-reluctance synchronous electrical machine.

In general, an electrical machine comprises a fixed part (stator) and a rotary part (rotor) which are arranged coaxially one inside the other.

In such machines, the rotor exhibits imbalance caused by manufacturing tolerances, mechanical design, the distribution of material, etc.

When the rotor rotates at high speed, the imbalance generates vibration which may cause the machine to malfunction or even cause damage to the rotor or to the machine.

In addition, this vibration causes noise which may detract from the comfort of using the machine.

It is therefore absolutely essential to greatly reduce or eliminate rotor imbalance in order to avoid these vibration phenomena.

In order to do so, provision is made for the rotor to be dynamically balanced according to specifications specified for each machine (noise level, vibrational frequency, etc.).

It is known practice, notably from document FR 1 341 204, to balance the rotor by removing material. More specifically, in order to counter rotor imbalance, machining is used to drill or mill material away from the body of this rotor.

The balancing through the removal of material has significant drawbacks.

Specifically, depending on how much material is removed, there is a risk that the mechanical properties of the rotor may be severely impaired.

Furthermore, the metal particles generated by the machining operation may impair the operation of the machine. These particles are attracted by the magnetic parts of at least one of the rotor and the stator which creates disturbances in the running, or even causing the two parts to jam relative to one another.

The addition of material to the body of the rotor is also a known solution for balancing a rotor.

The material used to compensate for the imbalance may be a paste, which is malleable at the time of application to the rotor, and which will then harden after application, ensuring that it adheres firmly to the rotor.

Balancing by adding balancing paste is, however, something that is difficult to achieve because the paste, after it has been applied to the rotor, takes time to dry and this drying time is dependent on external parameters such as the air temperature, the relative humidity, etc.

The rotor therefore has to be placed in a storage site for a highly variable length of time.

This entails complex logistics and increases the cost of production.

The material used may also be calibrated metal weights added to the rotor in order to balance same, such as clips, screws, etc.

By way of example and as best described in Patent Application FR 2 421 498, these metal weights are perforated sheets which are fixed by clamping or bonding onto axial pins projecting from the rotor.

In balancing involving the addition of material, it has, however, been found that, in the event of very significant angular acceleration or deceleration of the rotor and according to the aging of the machine, the paste or the calibrated weights may become detached from the rotor and therefore cause this rotor to become imbalanced. This loss of balancing therefore triggers vibration which is detrimental to the operation of the machine and to the comfort of the user.

In addition, the paste or the calibrated weights which have become detached may impede the rotation of the rotor causing serious machine malfunctions.

These disadvantages are even more significant in the case of a variable-reluctance electrical machines.

Such a machine comprises a rotor bearing permanent magnets which are housed near flux barriers borne by this rotor.

This configuration therefore makes balancing through the removal of material even more difficult given the small volume of material of which the rotor is made and because this removal needs to be performed in order to achieve balancing in a flux barrier which, by definition, is an empty space.

In addition, adding material carries the risk of perturbing the propagation of the magnetic flux of the magnets, notably when this addition is done in one or more flux barriers.

The present invention seeks to overcome the disadvantages described hereinabove by balancing the rotor using an addition of material without this addition perturbing the correct operation of the electrical machine.

SUMMARY OF THE INVENTION

To this end, the present invention relates to an electrical machine comprising a stator and a rotor, the rotor being formed of a rotor body having a stack of laminations placed on a rotor shaft, characterized in that the rotor comprises at least one cavity for receiving at least one balance weight for the dynamic balancing of the rotor.

The cavity may be positioned along the longitudinal axis of the rotor and substantially parallel thereto.

The cavity may be formed by a punching to remove material in the laminations.

The rotor may carry recesses housing magnetic-flux generators and recesses forming flux barriers, and the cavity may be formed near the periphery of the body.

The cavity may be situated between the recess housing the magnetic-flux generator furthest farthest from the rotor shaft and the periphery of the rotor body.

The cavity may have a closed cross section.

The invention also relates to a method for the dynamic balancing of a rotor of an electrical machine, the rotor comprising a rotor body formed by a stack of laminations and placed on a rotor shaft, characterized in that:
   the rotor imbalance is determined;
   the quantity of balance weight needed to counterbalance the determined imbalance is determined; and at least one balance weight is introduced into at least one receiving cavity placed in the body of the rotor.

The balance weight may be forcibly introduced into the cavity in order to immobilize it.

BRIEF DESCRIPTION OF THE DRAWINGS

The other features and advantages of the invention will now become apparent from reading the description which will follow, which is given solely by illustrative and non-limiting example, and to which are appended.

DETAILED DESCRIPTION OF THE INVENTION

Figure 1:
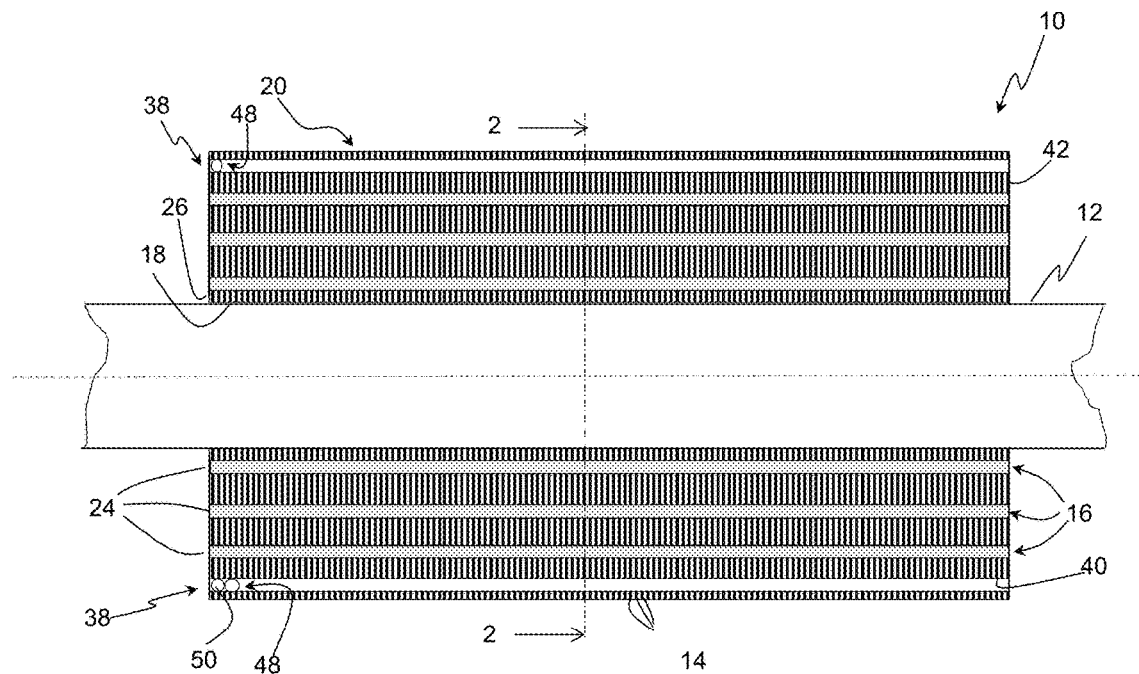
FIG. 1 is a schematic view of the rotor of the invention shown in axial section on 1-1 shown in FIG. 2.
Figure 2:
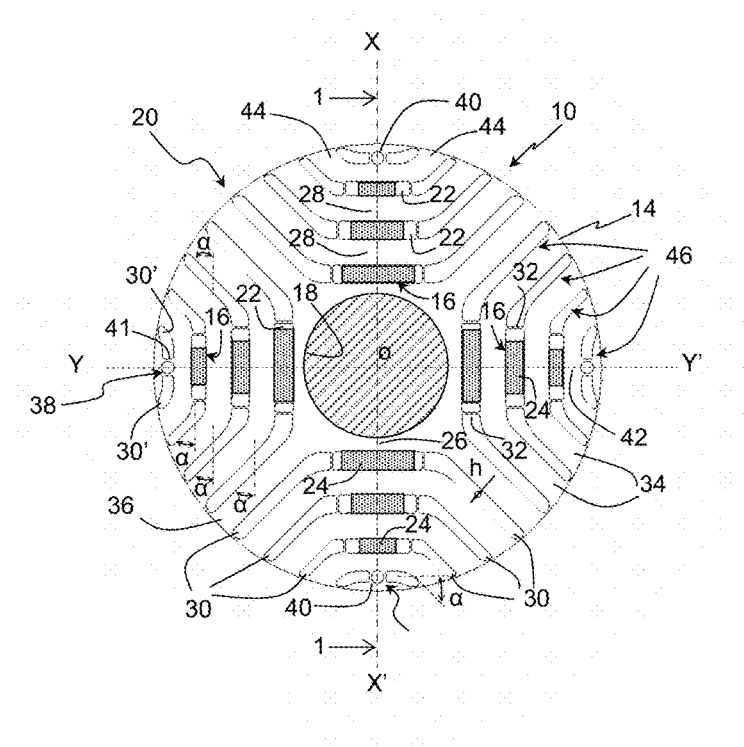
FIG. 2 is a schematic view of the rotor shown in radial section on 2-2 of FIG. 1.

According to the embodiment illustrated in FIGS. 1 and 2, the rotary electrical machine comprises a stator (not depicted) and a rotor 10.

As illustrated in FIG. 1, the rotor comprises, as is known per se, a shaft 12, which is preferably magnetic, on which a stack of identical planar ferromagnetic laminations 14 carrying a plurality of magnetic-flux generators 16 is placed.

With reference to FIG. 2, the circular laminations 14 comprise a central bore 18 through which the rotor shaft 12 passes and a plurality of axial recesses which pass through the laminations.

As is known, the laminations are assembled with one another by making the bores and the recesses to be aligned using any known technique, such as bonding, pressing, etc.

When assembled, the laminations form the body 20 of the rotor 10 which carries the shaft 12 via the central bores 18.

This configuration is more particularly applied to a variable-reluctance electrical machine as will be described later on.

In this configuration, the body comprises a first series of axial recesses which houses magnetic-flux generators, and another series of axial recesses making possible the creation of magnetic-flux barriers.

The first series of recesses 22 is, in this instance, in the shape of a quadrilateral, which in this instance is a rectangle. The recesses 22 accommodate the magnetic-flux generators, which in this instance are permanent magnets 24 in the form of bars which are rectangular, and are a length substantially equal to the length of the body. These recesses are referred to in the remainder of the description as "housings".

These housings 22 are positioned radially above one another and spaced a distance from one another which is measured from the center O of the bore 18.

As best visible in FIG. 2, these rectangular housings 22 are distributed along axes XX' and YY' which are substantially orthogonal and pass through the center O.

In the example of FIG. 2, each half-axis (OX, OX'; OY, OY') has three axial housings 22 with the longest faces being perpendicular to the half-axes and with the dimensions of these faces decreasing from the center O towards the periphery of the stack of laminations. Likewise, the height of these housings becomes smaller from the center O towards the periphery.

The housing 22 closest to the bore 18 may have a bridge of material 26 to this bore and a bridge of material 28 remains between each housing.

The housing 22 farthest away from the bore 18 is positioned spaced away from the peripheral edge of the body.

The other series of recesses are perforations 30, of substantially constant height h and which are inclined in a radial direction, starting from the housings extending to nearest the edge of the laminations.

The perforations start from the lateral edge 32 of the housings 22 and rise at an angle $\alpha$ with respect to a straight line parallel to the housings 22.

As depicted in FIG. 2, the inclined perforations are arranged symmetrically with respect to the housings. More specifically, a series of three inclined perforations is positioned on one side of the half-axis and another series of three inclined perforations is placed on the other side of this same half-axis.

Thus, a geometric figure is formed in each instance that is substantially in the shape of a V with a flattened bottom with the flattened bottom being formed by the housing 22 and with the inclined arms of the V being formed by the perforations 30 at each half-axis, three V-shapes are defined which are superposed, are some distance apart and have height and width dimensions decreasing from the bore towards the periphery of the body.

Thus except for the bridges of material 26, 28, a solid part 34 remains between the inclined perforations of each V-shape and another solid part 36 between the perforation closest to the bore of one series of three V-shapes and the perforation closest to the bore of another adjacent series of V-shapes.

This body further comprises at least one receiving cavity 38 for receiving rotor balance weights and which is situated between the V-shape farthest from the bore of the body and the periphery of the body of the rotor.

In the example of the figures, there is a cavity placed on each half-axis.

Advantageously, the cavity extends from one lateral face of the body to the other face and is substantially parallel to the shaft 12.

The cavity results from a punching operation 40 performed on each lamination and from the assembling of the laminations with one another thereby forming the cavity.

In addition, there are also two perforations 30' inclined by an angle $\alpha$ which start in a vicinity of the cavity 38, leaving a wall 41 which ends in a vicinity of the peripheral edge of the body. The at least two perforations are symmetric with one another with respect to the half-axis. As a result, the cavity is positioned between the two perforations 30.

A bridge of material 42 extends between the cavity 38 and the housing and a solid part 44 extends between the perforations 30 and 30'.

Flux barriers 46 are formed by the perforations. The magnetic flux coming from the magnets can therefore pass only through the bridges of material and the solid parts.

The cavity 38 has a closed cross section, which in this instance has a circular cross section, but any other cross section may be used, such as a polygonal cross section.

The cavity 38 is designed to receive at least one balance weight 48 which is immobilized therein.

The at least one weight may have a cross section similar to that of the cavity but with size greater in cross section to be able to be immobilized therein.

By way of example, in the case of a cavity 38 of circular cross section, the balance weight may be a ball 50 of a diameter greater than that of the cavity so that this ball is held in the cavity by friction.

In another example, the balance weight may have a cross section which is different from but which complements that of the cavity 38, such as a bar having a polygonal cross section which is forcibly introduced into the cavity of circular cross section.

In order to balance the rotor 10, it is necessary first of all to define and locate the imbalances that need balancing.

This operation is performed on appropriate machines which are widely known to those skilled in the art.

This makes it possible to determine, generally by calculation and in accordance with the imbalance correction laws, the quantity and positioning of balance weights to be added to the rotor in order to balance same.

The method according to the invention therefore adds one or more balance weights, in this instance in the form of balls, to one or more cavities 38.

Therefore the rotor can be balanced without weakening it by removing material or perturbing the transmission of the magnetic flux by removing or adding balancing material into the bridges and/or the solid parts.

The invention claimed is:

1. An electrical machine comprising:
   a stator and a rotor, the rotor having a rotor body formed with a stack of laminations which is placed on a rotor shaft, the rotor body comprising at least one cavity for receiving at least one balance weight for dynamically balancing the rotor, recesses housing magnetic flux generators, the recesses being shaped in a V having a flattened bottom and inclined arms, and each weight receiving cavity for receiving at least one balance weight being located between a periphery of the rotor body and the magnetic flux generator positioned farthest from the rotor shaft.

2. The electrical machine according to claim 1 wherein the at least one cavity for receiving the at least one balance weight is positioned along a longitudinal axis and parallel thereto.

3. The electrical machine according to claim 2 wherein the at least one cavity for receiving the at least one weight is formed by a hole punched in the laminations.

4. The electrical machine according to claim 3 wherein the at least one cavity for receiving has a closed cross section.

5. The electrical machine according to claim 2 wherein the at least one cavity for receiving has a closed cross section.

6. The electrical machine according to claim 1 wherein the at least one cavity for receiving the at least one weigh is formed by a hole punched in the laminations.

7. The electrical machine according to claim 6 wherein the at least one cavity for receiving has a closed cross section.

8. The electrical machine according to claim 1 wherein the at least one cavity for receiving has a closed cross section.

9. A method for dynamically balancing a rotor of an electrical machine comprising a rotor body including stacked laminations which are placed on a rotor shaft and V shaped recesses each having a flattened bottom and inclined arms that provide a magnetic flux barrier and at least one weight receiving cavity with each weight receiving cavity placed in the stacked laminations is located between a periphery of the rotor and a V shaped recess located farthest from the rotor shaft comprising:
   determining an amount of rotor imbalance;
   determining an amount of balance weight to be added to the at least one receiving cavity in the rotor body to counter balance the determined imbalance; and
   introducing at least one balance weight, equal in weight to the determined amount of balance weight, into the at least one receiving cavity in the stacked laminations.

10. The method according to claim 9 wherein the determined amount of balance weight is forcibly introduced in the at least one receiving cavity to immobilize the at least one balance weight therein.

* * * * *